United States Patent
Zhu et al.

(10) Patent No.: US 11,671,905 B2
(45) Date of Patent: Jun. 6, 2023

(54) PRIORITIZED SCANNING FOR IMPROVED SYSTEM ACQUISITION

(71) Applicant: Verizon Patent and Licensing Inc., Arlington, VA (US)

(72) Inventors: Lily Zhu, Parsippany, NJ (US); Andrew E. Youtz, Princeton, NJ (US); Hui Zhao, Marlboro, NJ (US); Samirkumar Patel, Middlesex, NJ (US); Xin Wang, Morris Plains, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 244 days.

(21) Appl. No.: 16/574,540

(22) Filed: Sep. 18, 2019

(65) Prior Publication Data
US 2021/0084576 A1    Mar. 18, 2021

(51) Int. Cl.
*H04W 48/16* (2009.01)
(52) U.S. Cl.
CPC .................. *H04W 48/16* (2013.01)
(58) Field of Classification Search
CPC ..... H04W 48/18; H04W 36/14; H04W 36/16; H04W 36/24; H04W 36/34; H04W 36/36
See application file for complete search history.

(56) References Cited

U.S. PATENT DOCUMENTS

| 2019/0150042 A1* | 5/2019 | Srivastava | H04W 48/16 455/436 |
| 2020/0053617 A1* | 2/2020 | Park | H04W 48/18 |
| 2020/0314861 A1* | 10/2020 | Goel | H04W 40/246 |

\* cited by examiner

*Primary Examiner* — Umair Ahsan (57) ABSTRACT

A method for prioritizing scanning to improve system acquisition includes scanning, by a user equipment device (UE), for base stations associated with a first radio access technology (RAT); establishing, by the UE, a first wireless channel between the UE and a first base station based on the first RAT; determining, by the UE, whether information associated with a second RAT was received via the first wireless channel; scanning, by the UE, for base stations associated with the second RAT in response to receiving the information via the first wireless channel, where the scanning is based on the received information; determining, by the UE, whether a second wireless channel based on the second RAT is established between the UE and a second base station; and camping, by the UE, on the second base station associated with the second RAT in response to determining that the second wireless channel was established.

20 Claims, 8 Drawing Sheets

PRIORITIZED SCANNING FOR IMPROVED SYSTEM ACQUISITION

BACKGROUND

Fourth generation wireless (4G) networks use existing wireless telecommunications standards which are widely deployed. Fifth Generation (5G) New Radio (NR) wireless networks, which improve over 4G networks by providing increased capacity and speed, are currently undergoing deployment. As 5G networks are introduced, both 4G and 5G networks may provide wireless connectivity to a user equipment device (UE) to enable fast and reliable services. When both 4G and 5G connectivity are available, it may be preferable for a UE to camp on a 5G cell providing service having increased bandwidth and reduced latency. However, acquiring 5G networks by scanning the wide frequency bands associated with 5G systems may lead to prolonged system acquisition times, especially in areas where 5G systems do not exist.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

In order to expedite the adoption of 5G networks, 5G cells can be introduced into areas where 4G cells currently exist. For example, a 5G non-standalone (NSA) mode may be deployed where data packets are exchanged via 5G networks, and control plane functionality is supported by long term evolution (LTE) networks, which may appear the same as LTE from a radio access technology (RAT) perspective. When 5G standalone configurations are introduced, 5G networks may operate in a standalone (SA) mode without the assistance of an LTE network, where the 5G network is used for both user and control planes as if another independent RAT. User equipment devices (UE) may have RATs compatible with both 5G SA (e.g., a 5G RAT) and NSA modes (e.g., 4G RAT). Even though in general 5G SA mode may be preferable when 5G coverage is available, it is not always efficient for a UE to scan for 5G when initial 5G deployment is scattered. Because some 5G carriers may have very wide bandwidths, idle scanning of such wide bandwidths by the UE can be time intensive and battery consuming.

As used herein, the term "camping" may refer to a UE being in an idle mode, thus maintaining limited exchanges with a wireless network within the confines of a previously selected cell. While camping, UE 110 may, for example, read System Information Broadcast (SIB) messages to determine the availability of a higher priority system, monitor a paging channel to detect incoming calls and acquire system information, perform control plane protocols including cell selection and reselection procedures, etc. For UE devices capable of both 5G SA and NSA operation, even though it may be desirable for the UE to camp on 5G bands (including, for example, millimeter wave technologies and sub-6 GHz frequencies) for improved throughput and reduced latency, the device may need to scan LTE carriers first and then transition to 5G when there is actually 5G coverage.

Embodiments described herein provide an approach for a UE to efficiently determine whether 5G coverage is available among cells also providing 4G service, and have the UE prioritize connectivity to the 5G RAT over available 4G RATs. This prioritization can be dependent upon on how a UE scans 4G frequencies versus 5G frequencies when establishing wireless connections with the base stations of the respective networks. In various embodiments, for UEs capable of both 5G SA and NSA operation, it may be preferable for the UE to camp on 5G SA bands to leverage high bandwidth and low latency service to avoid a delay greater than a threshold value that may be caused by initial service discovery upon power up of the UE. 5G SA bands may include wireless channels operating at frequencies from 410 MHz to 7125 MHz, which includes the sub-6 GHz frequency bands, and millimeter wave frequencies which span from 24.25 GHz to 52.6 GHz.

Because 5G SA deployment may be sparse initially, having the UE scan 5G SA bands for base stations may prevent quick system acquisition. For example, in one scenario when a UE initially powers up, scanning may occur as the UE does not yet have information regarding location. In another scenario, scanning may occur during system re-acquisition when, for example, a UE moves to an area beyond a previously connected cell area. This may occur when exiting an aircraft after air travel, for instance. Thus, if 5G bands are always the first frequencies scanned by the UE while 5G SA services are not fully deployed, the scanning time will unnecessarily delay system acquisition time.

Embodiments described herein are directed to wireless communications systems having multiple RATs that may improve efficiency by avoiding unnecessary scans of the 5G bands by performing prioritized scanning to improve system acquisition. Accordingly, in areas having neighboring and/or overlapping 4G and 5G cells, 4G base stations may transmit information to expedite UEs establishing wireless connections with neighboring 5G base stations. In an embodiment, a 4G base station may broadcast over a system information block (SIB) information regarding one or more 5G base stations. For example, an LTE base station may broadcast frequency information of a neighboring 5G base station over Information Element (IE) SystemInformationBlockType24 (hereinafter "SIB 24"). SIB 24 may contain information relevant for inter-RAT cell selection/reselection (that is, information about NR frequencies and NR neighboring cells relevant for cell selection/reselection). SIB 24 may include cell reselection parameters common for a particular frequency and/or a plurality of frequencies. The frequency information in SIB 24 may be used by a UE receiving the broadcast information to expedite the search for 5G base stations by narrowing the wide band of 5G frequencies scanned by the UE.

Given the wide deployment of LTE coverage, a UE may start with the 4G band as a first priority band for scanning. Once a 4G base station is found, the UE may then receive and read the system information blocks (including, for example, SIB 24) for 5G base stations. Because 5G systems may support RATs having higher bandwidths and reduced latency, camping on a 5G base station may be more desirable by offering new and/or improved services, thus the UE may give the 5G RAT a higher priority over the 4G RAT. Upon receiving information (e.g., frequency information) about the 5G base station, the UE may scan 5G frequencies based on the received information. In an embodiment, if in a defined time duration, the UE cannot find a 5G base station, the UE may then camp on the 4G system. Using a prioritized scanning approach in this manner can allow the UE to automatically acquire a 4G system if a 5G system is unavailable for coverage. Additionally, when 5G coverage is available (e.g., 5G SA coverage in sub 6 GHz band), the UE can quickly scan the band for the 5G frequency indicated by the SIB to efficiently acquire a 5G channel or system.

Figure 1:
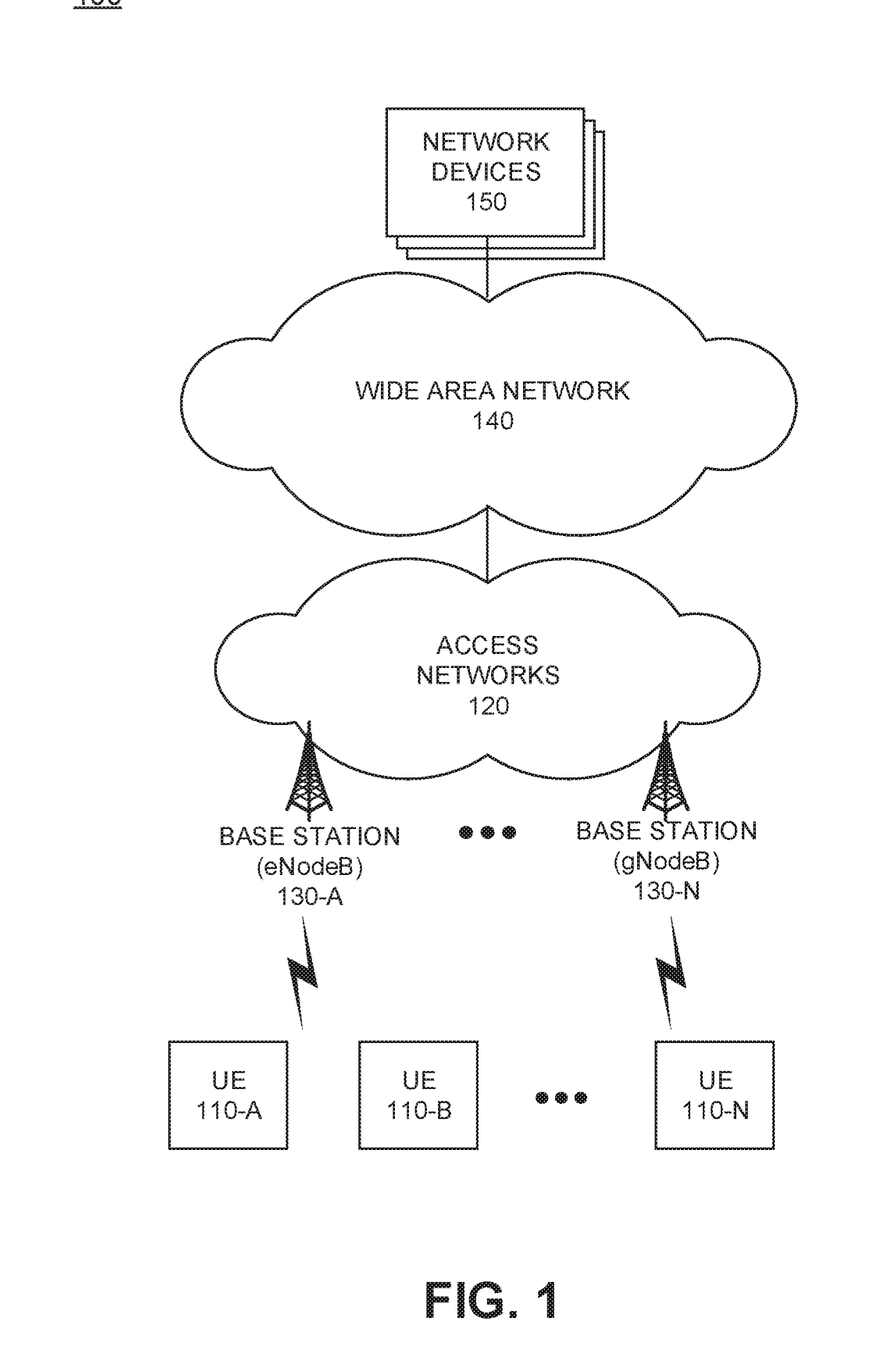
FIG. 1 is a diagram illustrating an exemplary network environment consistent with an embodiment.

FIG. 1 is a diagram illustrating an exemplary network environment 100 consistent with an embodiment. As shown in FIG. 1, environment 100 may include user equipment devices (UEs) 110-A to 110-N (referred to herein collectively as "UEs 110" and individually as "UE 110"), an access networks 120, a wide area network (WAN) 140, and network devices 150.

UEs 110 may include any device with wireless communication functionality which can operate in a cellular or mobile wireless network. For example, UE 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer, or a digital media player (e.g., Apple TV, Google Chromecast, Amazon Fire TV, etc.); a smart television; a portable gaming system; a global positioning system (GPS) device; a home appliance device; a home monitoring device; and/or any other type of computer device with wireless communication capabilities and a user interface. UE 110 may also include any type of customer premises equipment (CPE) such as a set top box, a wireless hotspot (e.g. an LTE or 5G wireless hotspot), a femto-cell, etc. UE 110 may include capabilities for voice communication, mobile broadband services (e.g., video streaming, real-time gaming, premium Internet access etc.), best effort data traffic, and/or other types of applications.

In some implementations, UEs 110 may communicate using machine-to-machine (M2M) communication, such as machine-type communication (MTC), a type of M2M communication standardized by the 3$^{rd}$ Generation Partnership Project (3GPP), and/or another type of M2M communication. UEs 110 may be embodied as Internet of things (IoT) devices, which may include health monitoring devices, asset tracking devices (e.g., a system monitoring the geographic location of a fleet of vehicles, etc.), sensors (e.g., utility sensors, traffic monitors, etc.)

Access networks 120 may provide access to WAN 140 for UEs 110. Access networks 120 may enable UEs 110 to connect to WAN 140 for IP services and/or non-IP data delivery services, mobile telephone service, Short Message Service (SMS), Multimedia Message Service (MMS), multimedia broadcast multicast service (MBMS), Internet access, cloud computing, and/or other types of data services. Access networks 120 may establish or may be incorporated into a packet data network connection between UE 110 and WAN 140 which may provide connectivity to one or more network devices 150.

In some implementations, access networks 120 may include a 4G wireless network which may, for example, utilize the Long Term Evolution (LTE) standard and thus include an evolved packet core (EPC) network. Furthermore, access networks 120 may include an LTE Advanced (LTE-A) access network and/or a 5G access network or other advanced network that includes functionality such as 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

In other implementations, access networks 120 may include a Code Division Multiple Access (CDMA) access network. For example, the CDMA access network may include a CDMA enhanced High Rate Packet Data (eHRPD) network (which may provide access to an LTE network).

As described herein, access networks 120 may include base stations 130-A to 130-N (referred to herein collectively as "base stations 130" and individually as "base station 130"). Each base station 130 may service a set of UEs 110. For example, base station 130-A may service UEs 110-A and 110-B, and base station 130-N may service UE 110-N. Base stations 130 may include 4G base stations (e.g., an evolved node B (eNodeB)) and/or 5G base stations (e.g., a next generation node B (gNodeB)). Each base station 130 may include one or more radio frequency (RF) transceivers supporting cells and/or sectors facing various directions. For example, base station 130 may include three RF transceivers and each RF transceiver may service a 120° sector of a 360° field of view. Each RF transceiver may include an antenna array. In one embodiment, the antenna array may include an array of controllable antenna elements configured to send and receive 5G wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element. The antenna array may serve k UEs 110 and may simultaneously generate up to k antenna beams. A particular antenna beam may service multiple UEs 110.

WAN 140 may include any type of wide area network, a metropolitan area network (MAN), an optical network, a video network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of WAN 140 may be managed by a provider of communication services that also manages access networks 120 and/or UEs 110. WAN 140 may allow the delivery of IP and/or non-IP services to/from UE 110, and may interface with other external networks. WAN 140 may include one or more server devices and/or network devices, or other types of computation or communication devices. In some implementations, WAN 140 may include an IP Multimedia Sub-system (IMS) network (not shown in FIG. 1). An IMS network may include a network for delivering IP multimedia services and may provide media flows between UE 110 and external IP networks or external circuit-switched networks (not shown in FIG. 1).

Network devices 150 may include one or more devices, such as computer devices, databases, and/or server devices, that facilitate IP and/or non-IP data services. Such services may include interactive voice, text, and/or video communication services. Examples may include communications applications (e.g., short message service (SMS), etc.), automotive applications, aviation applications, etc. Other services may support IoT applications such as alarms, sensors, medical devices, metering devices, smart home devices, wearable devices, retail devices, etc. Network devices 150 may communicate with UEs 110 over access networks 120 using IP and/or non-IP bearer channels. Network devices 150 may provide various services and be supported by service providers associated with various individuals or organizations (e.g., companies, non-profits, collaborative enterprises, etc.).

Although FIG. 1 shows exemplary components of environment 100, in other implementations environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
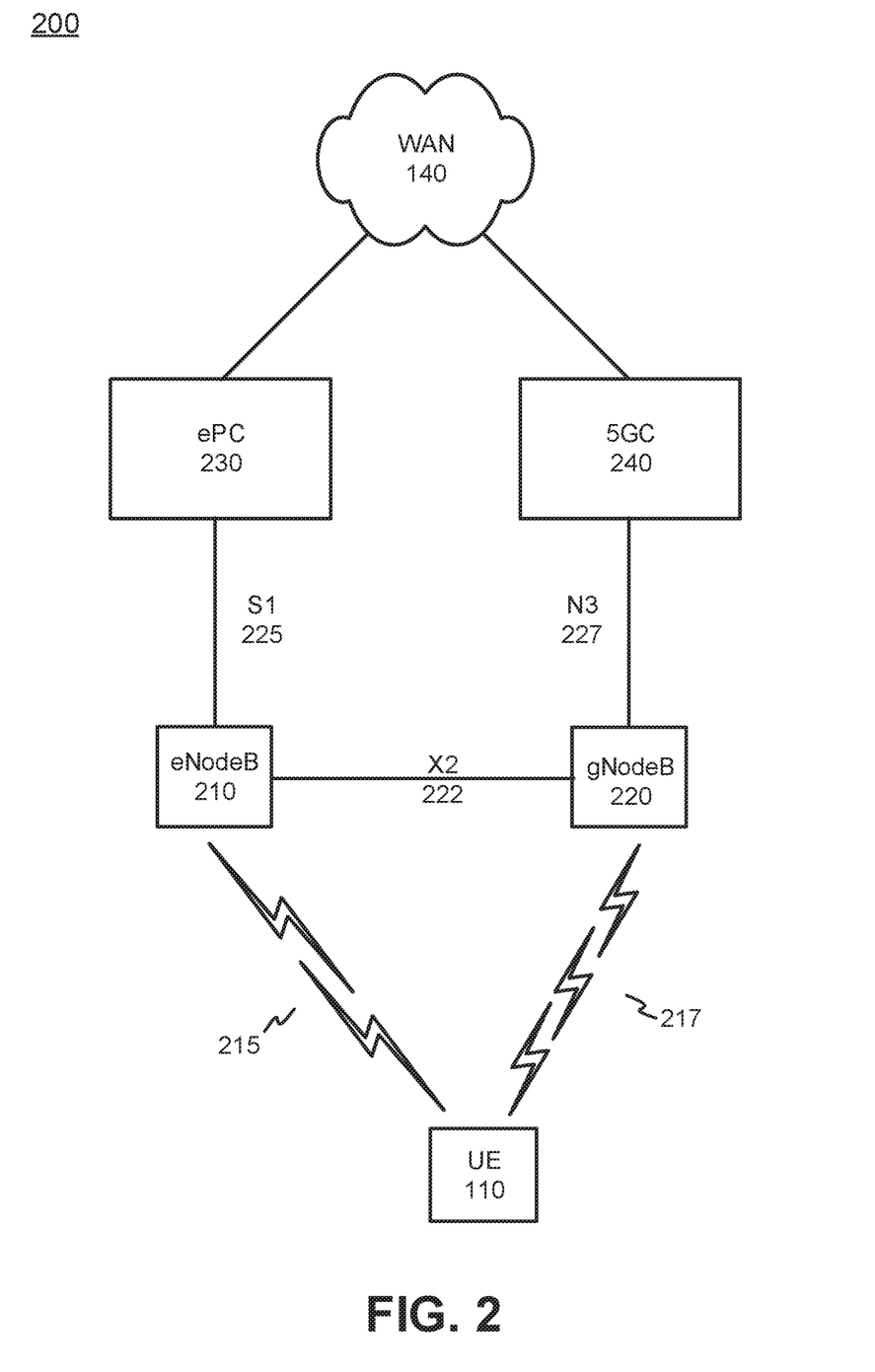
FIG. 2 is a block diagram of an exemplary networking system operating in a 5G NR standalone (SA) mode along with a 4G system, where the UE is capable of both 4G and 5G (Non-StandAlone and StandAlone) operation.

FIG. 2 is a block diagram of an exemplary networking system 200 configured to provide UE 110 standalone (SA) access based on 4G and/or 5G standards. Networking system 200 may include UE 110, eNodeB 210, gNodeB 220, evolved packet core (ePC) 230, 5G Core (5GC) 240, and WAN 140.

When operating in a SA mode, UE 110 may establish and communicate via independent wireless channels based on different standards for both signaling and data transfer. Therefore, UE 110 may be configured to operate in accordance with 4G and/or 5G NR standards. UE 110 may establish a wireless channel via LTE RAT 215 with eNodeB 210 using LTE signaling and data transfer protocols. Additionally or alternatively, UE 110 may also establish a wireless channel via 5G RAT 217 with gNodeB 220 based on 5G NR wireless signaling and protocols. Through LTE RAT 215 and/or 5G RAT 217, UE 110 may exchange data with other network devices within ePC 230, 5GC 240, and WAN 140.

As shown in the embodiment illustrated in FIG. 2, the 4G core network may be implemented as an ePC 230 which works in conjunction with an evolved Universal Mobile Telecommunications System (UMTS) Terrestrial Network (eUTRAN) that includes at least one eNodeB 210. The 5G core network may be implemented as a 5GC 240 which works in conjunction with a next generation radio access network (NG-RAN) that includes at least one gNodeB 220. Networking system 200 may further include an Internet Protocol (IP) network, which may be embodied separately or included in a backhaul network (not shown) and/or WAN 140.

EPC 230 may include one or more devices that are physical and/or logical entities interconnected via standardized interfaces. EPC 230 provides wireless packet-switched services and wireless IP connectivity to user devices to provide, for example, data, voice, and/or multimedia services. EPC 230 may further include other functional entities discussed in more detail in reference to FIG. 3. 5GC 240 may also include one or more devices that are physical and/or logical entities interconnected via standardized interfaces. 5GC 240 provides wireless packet-switched services and wireless IP connectivity to user devices to provide, for example, data, voice, and/or multimedia services. 5GC 240 may further include other functional entities discussed in more detail in reference to FIG. 4.

Further referring to FIG. 2, eNodeB 210 and gNodeB 220 may include one or more devices and other components having functionality that allows UE 110 to wirelessly connect the respective RAT 215, 217 of eNodeB 210 and gNodeB 220, respectively. ENodeB 210 may interface with ePC 230 via a S1 interface 225, which may be split into a control plane S1 interface and a data plane S1. GNodeB 220 may interface with 5GC 240 via a N3 interface 227. ENodeB 210 and gNodeB 220 may communicate directly over an X2 interface 222 that may serve, for example, as a failover data connection in the event one of the wireless channels associated with RATs 215, 217 fails. The X2 interface 222 may use a protocol that tunnels end-user packets between eNodeB 210 and gNodeB 220, where the tunneling function supports the identification of packets with the tunnels and packet loss management. X2 interface 222 may use General packet radio services Tunneling Protocol (GTP-U) over user datagram protocol (UDP) or internet protocol (IP) as the transport layer protocol.

While FIG. 2 shows exemplary components of networking system 200, in other implementations, networking system 200 may include fewer components, different components, differently arranged components, or additional components than depicted in FIG. 2. Additionally or alternatively, one or more components of networking system 200 may perform functions described as being performed by one or more other components of networking system 200.

Figure 3:
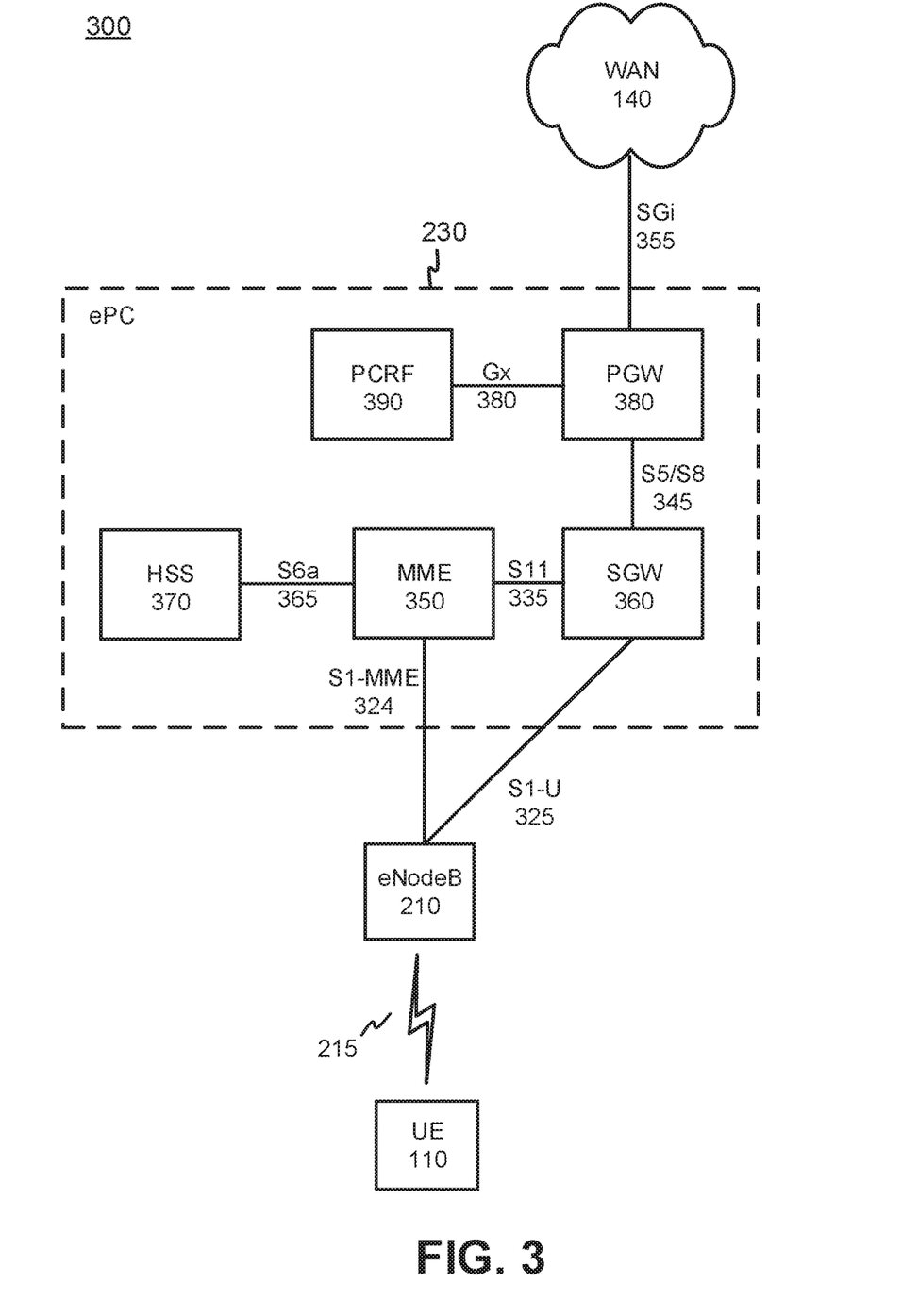
FIG. 3 is a block diagram showing exemplary components of an evolved packet core (ePC) according to an embodiment.

FIG. 3 is a block diagram of an exemplary networking system 300 based on the LTE standard. Networking system 300 may include an LTE network with ePC 230 and eNodeB 210 (corresponding, for example, to base station 130-A). UE 110 and eNodeB 210 may exchange data over a RAT 215 based on LTE wireless channel interface protocols. Networking system 300 may further include an Internet Protocol (IP) network and/or a non-IP network, which may be embodied separately or included in a backhaul network (not shown) and/or in WAN 140. WAN 140 may provide connectivity to other network devices (not shown) using, for example, transmission control protocol/internet protocol (TCP/IP) and/or a non-IP based protocol.

EPC 230 may include one or more devices that are physical and/or logical entities interconnected via standardized interfaces. EPC 230 provides wireless packet-switched services and wireless packet connectivity to user devices to provide, for example, data, voice, and/or multimedia services. EPC 230 may further include a mobility management entity (MME) 350, a serving gateway (SGW) 360, a home subscriber server (HSS) 370, a packet data network gateway (PGW) 380, and a Policy and Charging Rules Function (PCRF) 390. FIG. 3 depicts a representative networking system 300 with exemplary components and configuration shown for purposes of explanation. Other embodiments may include additional or different network entities in alternative configurations than which are exemplified in FIG. 3.

Further referring to FIG. 3, eNodeB 210 may interface with ePC 230 via a S1 interface, which may be split into a control plane S1-MME interface 324 and a data plane S1-U interface 325. For example, enodeB 210 may interface with MME 350 via S1-MME interface 324, and interface with SGW 360 via S1-Uf interface 325. S1-U interface 325 may be implemented, for example, using GTP. S1-MME interface 324 may be implemented, for example, with a protocol stack that includes a Non-Access Stratum (NAS) protocol and/or Stream Control Transmission Protocol (SCTP).

MME 350 may implement control plane processing for both the primary access network and the secondary access network. For example, through eNodeB 210, MME 350 may implement tracking and paging procedures for UE 110, may activate and deactivate bearers for UE 110, and may authenticate a user of UE 110 to provide normal coverage service for operating in normal UE device mode. MME 350 may also select a particular SGW 360 for a particular UE 110. MME 350 may interface with other MMEs (not shown) in ePC 230 and may send and receive information associated with UEs 110, which may allow one MME 350 to take over control plane processing of UEs serviced by another MME 350, if the other MME becomes unavailable.

SGW 360 may provide an access point to and from UE 110, may handle forwarding of data packets for UE 110, and may act as a local anchor point during handover procedures between eNodeBs 210. SGW 360 may interface with PGW 380 through an S5/S8 interface 345. S5/S8 interface 345 may be implemented, for example, using GTP.

PGW 380 may function as a gateway to WAN 140 through an SGi interface 355. WAN 140 may provide various services (e.g., over the top voice services) to UE 110. A particular UE 110, while connected to a single SGW 360, may be connected to multiple PGWs 380, one for each packet network with which UE 110 communicates.

Alternatively, UE 110 may exchange data with WAN 140 though a WiFi wireless access point (WAP) (not shown). The WiFi WAP may be part of a local area network, and access WAN 140 through a wired connection via a router. Alternatively, the WiFi WAP may be part of a mesh network (e.g., 802.11s). The WiFi WAP may operate in accordance with any type of WiFi standard (e.g., any IEEE 802.11x network, where x=a, b, c, g, and/or n), and/or include any other type of wireless network technology for covering larger areas, and may include a mesh network (e.g., IEEE 802.11s) and/or or a WiMAX IEEE 802.16. The WiFi WAP may also be part of a wide area network (WiMAX) or a mesh network (802.11s).

MME 350 may communicate with SGW 360 through an S11 interface 335. S11 interface 335 may be implemented, for example, using GTPv2. S11 interface 335 may be used to create and manage a new session for a particular UE 110. S11 interface 335 may be activated when MME 350 needs to communicate with SGW 360, such as when the particular UE 110 attaches to ePC 230, when bearers need to be added or modified for an existing session for the particular UE 110, when a connection to a new PGW 380 needs to be created, or during a handover procedure (e.g., when the particular UE 110 needs to switch to a different SGW 360).

HSS 370 may store information associated with UE 110 and/or information associated with users of UE 110. For example, HSS 370 may store user profiles that include registration, authentication, and access authorization information. MME 350 may communicate with HSS 370 through an S6a interface 365. S6a interface 365 may be implemented, for example, using a Diameter protocol.

PCRF 390 provides policy control decision and flow based charging control functionalities. PCRF 390 may provide network control regarding service data flow detection, gating, Quality of Service (QoS) and flow based charging, etc. PCRF 390 may determine how a certain service data flow shall be treated, and may ensure that user plane traffic mapping and treatment is in accordance with a user's subscription profile based, for example, on a specified quality of service (QoS) class identifier (QCI). PCRF 390 may communicate with PGW 380 using a Gx interface 380. Gx interface 380 may be implemented, for example, using a Diameter protocol.

While FIG. 3 shows exemplary components of networking system 300, in other implementations, networking system 300 may include fewer components, different components, differently arranged components, or additional components than depicted in FIG. 3. Additionally or alternatively, one or more components of networking system 300 may perform functions described as being performed by one or more other components of networking system 300.

Figure 4:
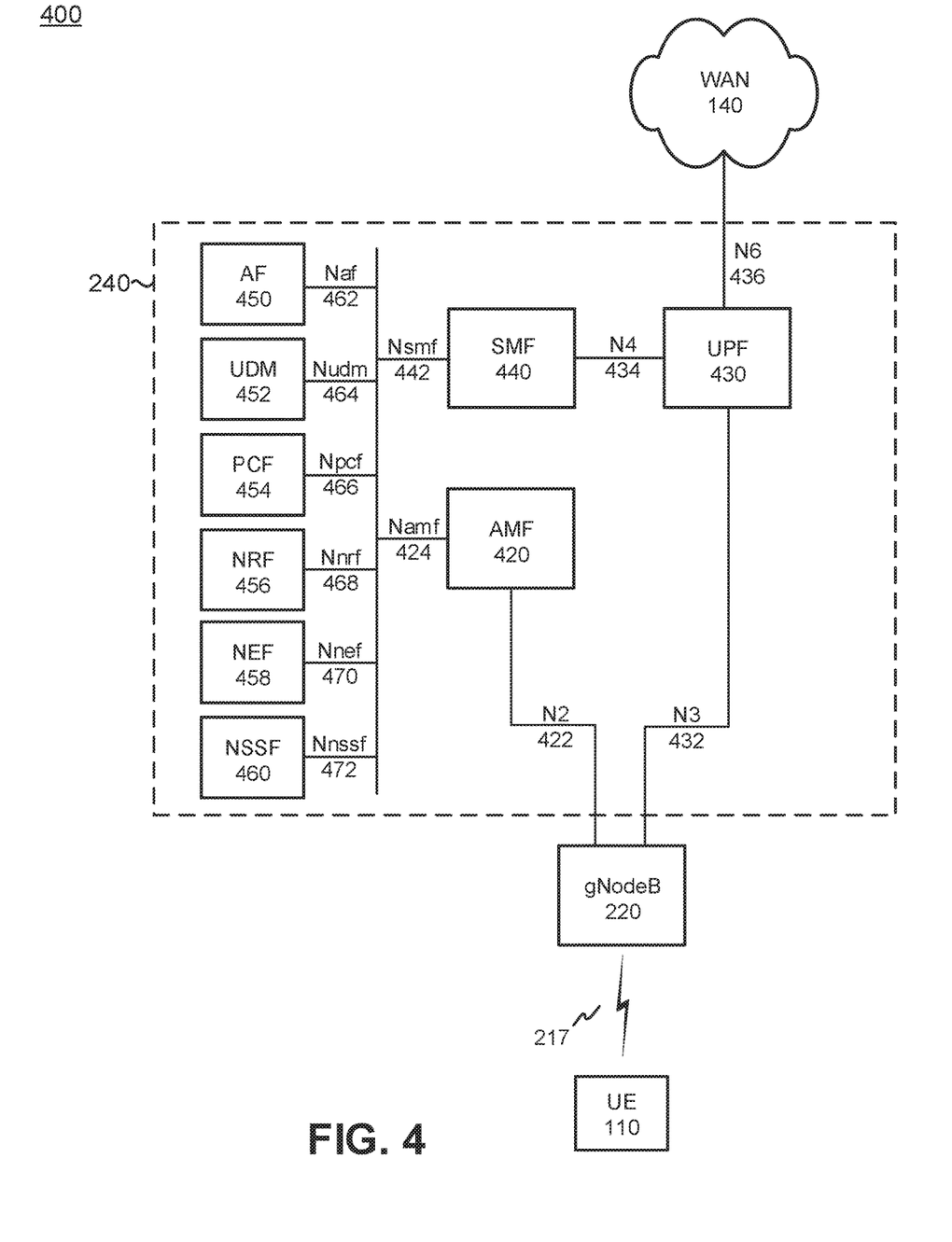
FIG. 4 is a block diagram showing exemplary components of a 5G core (5GC) according to an embodiment.

FIG. 4 is a block diagram of an exemplary 5G system 400 which may be part of access networks 120. As shown in FIG. 4, system 400 may include UE 110, WAN 140, gNodeB 220, and 5G Core (5GC) 240.

5GC 240 may include an Access and Mobility Function (AMF) 420, a User Plane Function (UPF) 430, a Session Management Function (SMF) 440, an Application Function (AF) 450, a Unified Data Management (UDM) 452, a Policy Control Function (PCF) 454, a Network Repository Function (NRF) 456, a Network Exposure Function (NEF) 458, and a Network Slice Selection Function (NSSF) 460. While FIG. 4 depicts a single gNodeB 220, AMF 420, UPF 430, SMF 440, AF 450, UDM 452, PCF 454, NRF 456, NEF 458, and/or NSSF 460 for exemplary illustration purposes, in practice, FIG. 4 may include multiple gNodeBs 220, AMFs 420, UPFs 430, SMFs 440, AFs 450, UDMs 452, PCFs 454, NRFs 456, NEFs 458, and NSSFs 460.

GNodeB 220 may include one or more cells, with each cell including a wireless transceiver with an antenna array configured for frequencies include sub 6 Ghz and millimeter-wave wireless communication in accordance with the 5G standard. gNodeB 220 may implement one or more RAN slices to partition access networks 120. gNodeB 220 may communicate with AMF 420 using an N2 interface 422 and communicate with UPF 430 using an N3 interface 432.

AMF 420 may perform registration management, connection management, reachability management, mobility management, lawful intercepts, Short Message Service (SMS) transport between UE 110 and an SMS function (not shown in FIG. 4), session management messages transport between UE 110 and SMF 440, access authentication and authorization, location services management, functionality to support non-3GPP access networks, and/or other types of management processes. In some implementations, AMF 420 may implement some or all of the functionality of managing RAN slices in gNodeB 220. AMF 420 may be accessible by other function nodes via a Namf interface 424.

UPF 430 may maintain an anchor point for intra/inter-RAT mobility, maintain an external Packet Data Unit (PDU) point of interconnect to a data network (e.g., WAN 140), perform packet routing and forwarding, perform the user plane part of policy rule enforcement, perform packet inspection, perform lawful intercept, perform traffic usage reporting, enforce QoS policies in the user plane, perform uplink traffic verification, perform transport level packet marking, perform downlink packet buffering, send and forward an "end marker" to a Radio Access Network (RAN) node (e.g., gNodeB 220), and/or perform other types of user plane processes. UPF 430 may communicate with SMF 440 using an N4 interface 434 and connect to WAN 140 using an N6 interface 436.

SMF 440 may perform session establishment, modification, and/or release, perform IP address allocation and management, perform Dynamic Host Configuration Protocol (DHCP) functions, perform selection and control of UPF 430, configure traffic steering at UPF 430 to guide traffic to the correct destination, terminate interfaces toward PCF 454, perform lawful intercepts, charge data collection, support charging interfaces, control and coordinate of charging data collection, termination of session management parts of network access stratum (NAS) messages, perform downlink data notification, manage roaming functionality, and/or perform other types of control plane processes for managing user plane data. SMF 440 may be accessible via an Nsmf interface 442.

AF 450 may provide services associated with a particular application, such as, for example, application influence on traffic routing, accessing NEF 458, interacting with a policy framework for policy control, and/or other types of applications. AF 450 may be accessible via a Naf interface 462.

UDM 452 may maintain subscription information for UE 110, manage subscriptions, generate authentication credentials, handle user identification, perform access authorization based on subscription data, perform network function registration management, maintain service and/or session continuity by maintaining assignment of SMF 440 for ongoing sessions, support SMS delivery, support lawful intercept functionality, and/or perform other processes associated with managing user data. UDM 452 may be accessible via a Nudm interface 464.

PCF 454 may support policies to control network behavior, provide policy rules to control plane functions (e.g., to SMF 440), access subscription information relevant to policy decisions, execute policy decisions, and/or perform other types of processes associated with policy enforcement. PCF 454 may be accessible via Npcf interface 466. PCF 454 may specify QoS policies based on QoS flow identity (QFI) consistent with 5G network standards.

NRF 456 may support a service discovery function and maintain a profile of available network function (NF) instances and their supported services. An NF profile may include an NF instance identifier (ID), an NF type, a Public Land Mobile Network (PLMN) ID associated with the NF, a network slice ID associated with the NF, capacity information for the NF, service authorization information for the NF, supported services associated with the NF, endpoint information for each supported service associated with the NF, and/or other types of NF information. NRF 456 may be accessible via an Nnrf interface 468.

NEF 458 may expose capabilities, events, and/or status to other NFs, including third party NFs, AFs, edge computing NFs, and/or other types of NFs. For example, NEF 458 may provide capabilities and events/status of UE 110 to network devices in WAN 140. Furthermore, NEF 458 may secure provisioning of information from external applications to access networks 120, translate information between access networks 120 and devices/networks external to access networks 120, support a Packet Flow Description (PFD) function, and/or perform other types of network exposure functions. NEF 458 may be accessible via Nnef interface 470.

NSSF 460 may select a set of network slice instances to serve a particular UE 110, determine network slice selection assistance information (NSSAI), determine a particular AMF 420 to serve a particular UE 110, and/or perform other types of processes associated with network slice selection or management. In some implementations, NSSF 460 may implement some or all of the functionality of managing RAN slices in gNodeB 220. NSSF 460 may be accessible via Nnssf interface 472.

Although FIG. 4 shows exemplary components of 5GC 240, in other implementations, 5GC 240 may include fewer components, different components, differently arranged components, or additional components than depicted in FIG. 4. Additionally or alternatively, one or more components of 5GC 240 may perform functions described as being performed by one or more other components of 5GC 240. For example, 5GC 240 may include additional function nodes not shown in FIG. 4, such as an Authentication Server Function (AUSF), a Non-3GPP Interworking Function (N3IWF), a Unified Data Repository (UDR), an Unstructured Data Storage Network Function (UDSF), an SMS function (SMSF), a 5G Equipment Identity Register (5G-EIR) function, a Location Management Function (LMF), a Security Edge Protection Proxy (SEPP) function, and/or other types of functions. Furthermore, while particular interfaces have been described with respect to particular function nodes in FIG. 4, additionally or alternatively, 5GC 240 may include a reference point architecture that includes point-to-point interfaces between particular function nodes.

Figure 5:
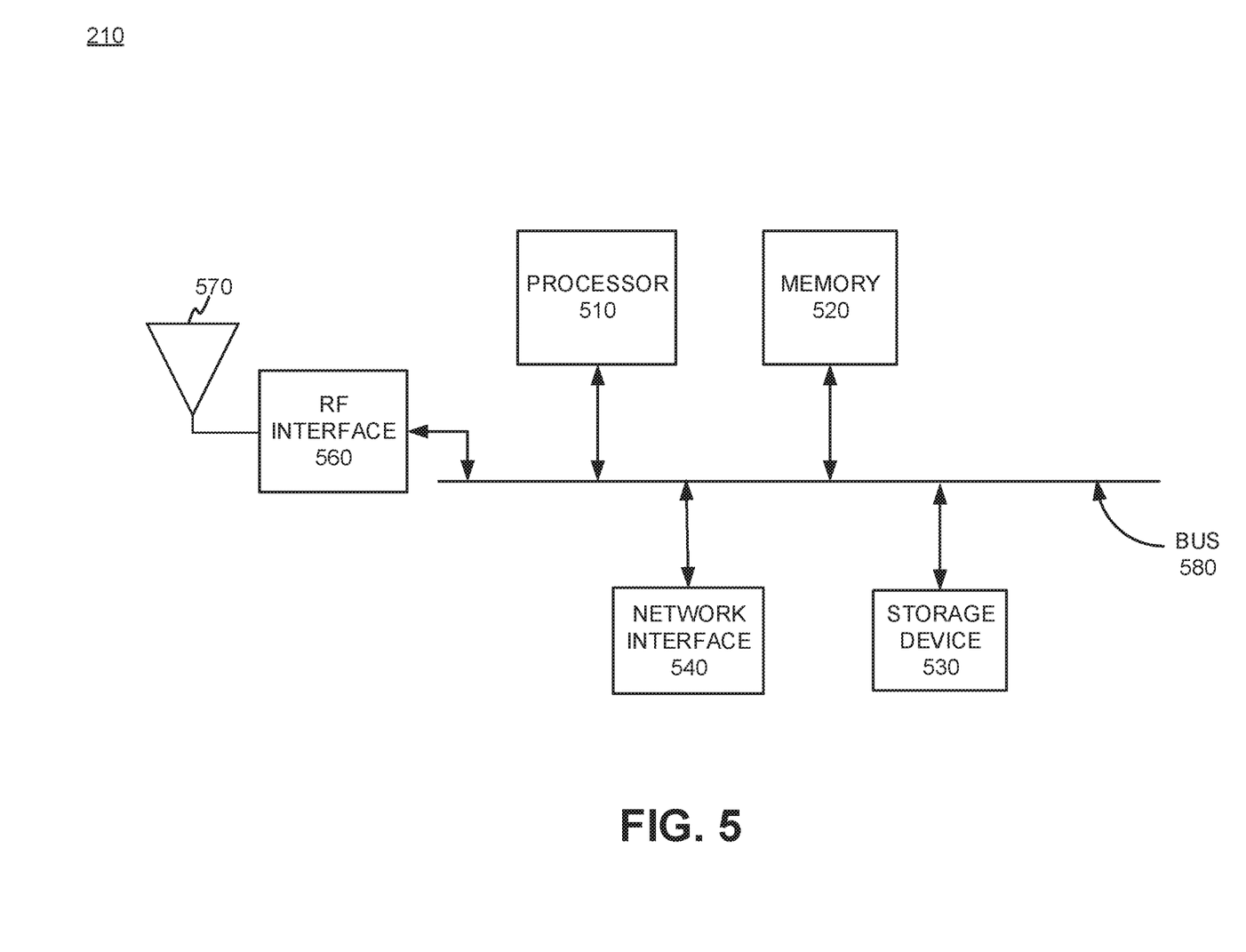
FIG. 5 is a block diagram showing exemplary components of an LTE base station according to an embodiment.

FIG. 5 is a block diagram showing exemplary components of an eNodeB 210 according to an embodiment. ENodeB 210 may provide connectivity to UE 110 over a wireless channel interface using RAT 215 based on wireless protocols in accordance with LTE, LTE Advanced, 3GPP 4G and/or 4.5G. ENodeB 210 may provide wireless network connectivity to devices connected to ePC 230 in a dual connectivity, multi-RAT configuration, and to network devices connected to wide area networks (e.g., the Internet). As shown in FIG. 5, eNodeB 210 may include a processor 510, a memory 520, a storage device 530, a network interface 540, a radio frequency (RF) interface 560, and an antenna 570. A bus 580 may interconnect the components of eNodeB 210 to exchange data and/or analog signals.

Processor 510 may include one or more processors, microprocessors, application specific integrated circuits (ASICs), field programmable gate arrays (FPGAs), and/or other processing logic. Processor 510 may control operation of eNodeB 210 and its components and perform signal processing operations, for example, the digital modulation and demodulation of signals. Processor 510 may also perform processing to facilitate communications over the backhaul network and WAN 140. Processor 510 may also operate in the non-access stratum and thus facilitates signaling and coordination with network devices in wireless access network to manage the establishment of communication sessions and for maintaining continuous communications. Processor 510 may include a modem (not shown) and function together to facilitate the operations of eNodeB 210 in accordance with a variety of wireless communication protocols.

Memory 520 may include a random access memory (RAM) or another type of dynamic storage device, a read only memory (ROM) or another type of static storage device, a removable memory card, and/or another type of memory to store data and instructions that may be used by processor 510. Storage device 530 may include any type of mass storage device such as a hard disk, a solid state disk, etc., for long term and/or scratch storage of data and instructions used by processor 510.

Network interface 540 may include a logical component that includes input and/or output ports, input and/or output systems, and/or other input and output components that facilitate the transmission of data to other devices via a backhaul link. For example, network interface 540 may include a modem, a network interface card (e.g., Ethernet card) for wired communications and/or a wireless network interface (e.g., a WiFi) card for wireless communications.

RF interface 560 may include one or more RF transceivers that enable eNodeB 210 to communicate with UEs 110 via wireless communications using RAT 215. An RF transceiver may include an RF transmitter that receives signals to be transmitted wirelessly and performs signal processing on the signals before providing the signals to antenna 570, and an RF receiver that receives signals from antenna 570 and performs RF signal processing on the received signals before providing the received signals to processor 510. For example, the RF transceiver may perform analog-to-digital and digital-to-analog conversion, analog and/or digital modulation and demodulation, up-conversion and down-conversion, and/or amplification of signals.

Antenna 570 may include one or more antennas to transmit and/or receive RF signals over the air. Antenna assembly 570 may, for example, receive RF signals from network interface 540 and transmit the signals over the air, and receive RF signals over the wireless and provide them to network interface 540.

As described herein, eNodeB 210 may perform certain operations in response to processor 510 executing software instructions contained in a computer-readable medium, such as memory 520 and/or storage device 530. A computer-readable medium may be defined as a non-transitory memory device. A non-transitory memory device may include memory space within a single physical memory device or spread across multiple physical memory devices. The software instructions may be read into memory 520 from another computer-readable medium or from another device via network interface 540. Alternatively, hardwired circuitry may be used in place of, or in combination with, software instructions to implement processes described herein. Thus, implementations described herein are not limited to any specific combination of hardware circuitry and software.

Although FIG. 5 shows example components of eNodeB 210, in other implementations, eNodeB 210 may include fewer components, different components, differently arranged components, or additional components than those depicted in FIG. 5. Additionally or alternatively, one or more components of eNodeB 210 may perform the tasks described as being performed by one or more other components of eNodeB 210.

Figure 6:
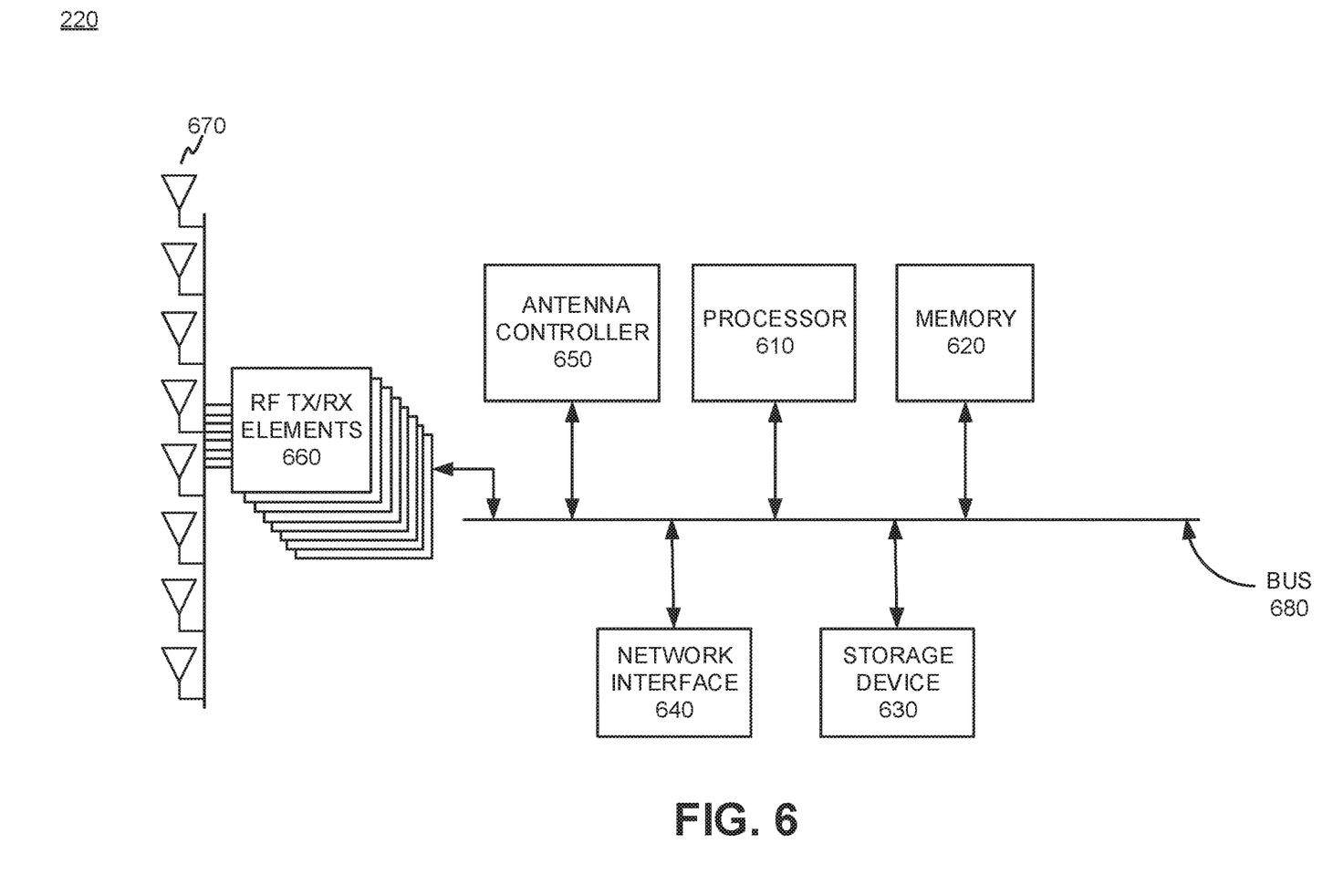
FIG. 6 is a block diagram showing exemplary components of a 5G base station according to an embodiment.

FIG. 6 is a block diagram showing exemplary components of a gNodeB 220 according to an embodiment. GNodeB 220 may provide connectivity to UE 110 over an wireless channel interface using RAT 217 based on wireless protocols in accordance with 3GPP 5G. GNodeB 220 may further provide wireless and/or wireless network connectivity to other UEs 110 connected to ePC 230 via RAT 215, and to networks (e.g., Internet) and devices (e.g., access servers) connected to WAN 140. GNodeB 220 may include a processor 610, a memory 620, a storage device 630, a network interface 640, an antenna controller 650, RF transmit/receive (TX/RX) elements 660, and an antenna array 670. A bus 680 may interconnect the components of gNodeB 220 to exchange data and/or analog signals.

Processor 610 may include one or more processors, microprocessors, ASICs, FPGAs, and/or other processing logic that may interpret and execute instructions and/or low level logic. Processor 610 may control operation of gNodeB 220 and its components. Processor 610 may also perform various communications and signal processing operations allowing for gNodeB 220 to efficiently communicate over the wireless network. Processor 610 may also perform processing to facilitate communications over the backhaul network and WAN 140. Processor 610 may also operate in the non-access stratum and thus facilitate signaling and coordination with network devices in wireless access network to manage the establishment of communication sessions and for maintaining continuous communications.

Memory 620 may include a random access memory (RAM) or another type of dynamic storage device to store data and instructions that may be used by processor 610. Storage device 630 may include a persistent solid state read/write device, a magnetic, and/or optical recording medium and its corresponding drive.

Network interface 640 may include a logical component that includes input and/or output ports, input and/or output systems, and/or other input and output components that facilitate the transmission of data to other devices via a backhaul link. For example, network interface 640 may include a modem, a network interface card (e.g., Ethernet card) for wired communications and/or a wireless network interface (e.g., a WiFi) card for wireless communications.

Antenna controller 650 may accept data and/or commands (e.g. pointing and/or beamforming commands) from processor 610. Antenna controller 650 may perform transmit (TX) multiple input multiple output (MIMO) encoding to produce multiple channels of data, for a set of the antenna elements in antenna array 670, which may be transmitted over a downlink channel. Signals which have been received over an uplink channel via antenna array 670 may be decoded using receive (RX) MIMO decoding to combine streams into fewer data channels or a single received channel. Antenna controller 650 may further apply beamforming weights (which perform relative phase, frequency, and amplitude modulations between the antenna elements) on the transmit data streams to electronically adjust the transmit antenna pattern. Additionally, antenna controller 650 apply beamforming weights on the receive data streams to electronically adjust the receive antenna pattern.

RF TX/RX elements 660 may include discreet RF elements to amplify, frequency demodulate (e.g., down convert) analog channels received via an uplink channel through antenna array 670, and convert the analog channels to received digital streams using analog to digital converters. The received digital streams may be passed to antenna controller 650 which may further perform RX MIMO processing to combine MIMO streams. RF TX/RX elements 660 may further process transmit digital streams, which may be TX MIMO encoded by antenna controller 650 prior to being converted to analog signals using digital to analog converters. The analog signals may be frequency upconverted and amplified for transmission at RF TX/RX elements 660, and subsequently radiated by antenna array 670, over a downlink channel.

Antenna array 670 may include a number of antenna elements in order to serve multiple sectors and/or to provide various antenna characteristics (e.g., antenna beam width, gain, side lobe control, etc.) appropriate for gNodeB 220 operations. The antenna elements may have independent channels that may be used for electronic adjustments of both the transmit and receive antenna patterns, and/or also for transmit and/or receive MIMO processing to improve wireless channel reliability and/or throughput. In an embodiment, antenna elements 670 may be "grouped" (though physical and/or electronic arrangement) and designated for communication with UEs 110 within a particular sector of gNodeB's 220 overall coverage. The sector may be divided into angular segments (measured in a horizontal plane) pointing in different directions in order to distribute coverage for gNodeB 220. For example, antenna elements 670 may be grouped in a triangular arrangement so each side of the triangle serves a 120-degree sector. The antenna pattern, generated by the antenna elements associated with a particular sector, may be characterized by angles (e.g., azimuth and elevation) defined by a sector reference direction for the sector. The sector reference direction may be specified by a vector extending from a reference point associated with the sector.

As described herein, gNodeB 220 may perform certain operations in response to processor 610 executing software instructions contained in a computer-readable medium, such as memory 620 and or storage device 630. A computer-readable medium may be defined as a non-transitory memory device. A non-transitory memory device may include memory space within a single physical memory device or spread across multiple physical memory devices. The software instructions may be read into memory 620 from another computer-readable medium or from another device via network interface 640. The software instructions contained in memory 620 may cause processor 610 to perform processes which include enabling both normal coverage mode and enhanced coverage mode. Alternatively, hardwired circuitry may be used in place of, or in combination with, software instructions to implement processes described herein. Thus, implementations described herein are not limited to any specific combination of hardware circuitry and software.

Although FIG. 6 shows example components of gNodeB 220, in other implementations, gNodeB 220 may include fewer components, different components, differently arranged components, or additional components than those depicted in FIG. 6. Additionally, or alternatively, one or more components of gNodeB 220 may perform the tasks described as being performed by one or more other components of gNodeB 220.

Figure 7:
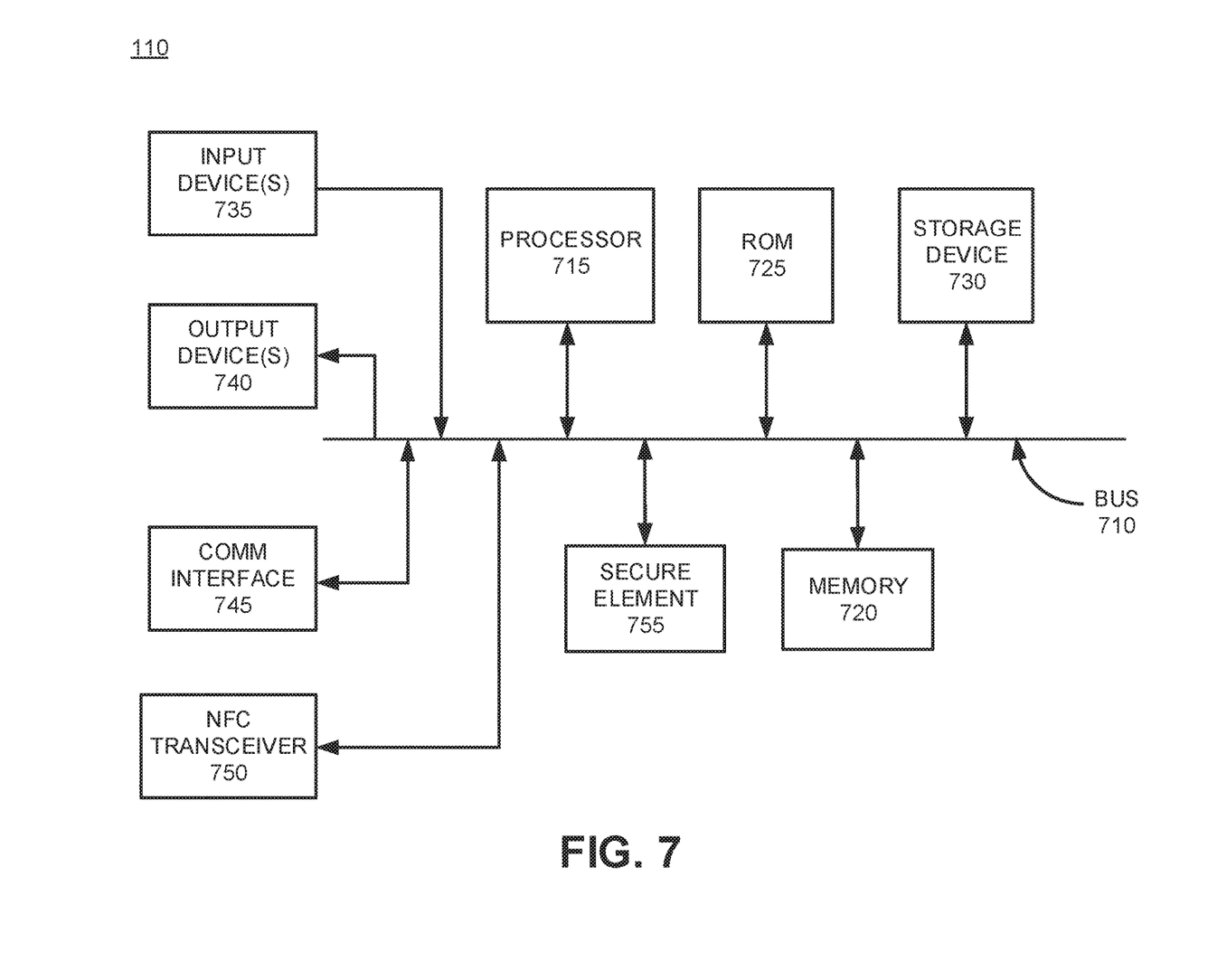
FIG. 7 is a block diagram showing exemplary components of a user equipment device (UE) according to an embodiment.

FIG. 7 is a block diagram showing exemplary components of UE 110 according to an embodiment. UE 110 may include a bus 710, a processor 715, memory 720, a read only memory (ROM) 725, a storage device 730, one or more input device(s) 735, one or more output device(s) 740, a communication interface 745, a Near Field Communications (NFC) transceiver 750, and Secure Element (SE) 755. Bus 710 may include a path that permits communication among the elements of UE 110.

Processor 715 may include a processor, microprocessor, or processing logic that may interpret and execute instructions. Memory 720 may include a random access memory (RAM) or another type of dynamic storage device that may store information and instructions for execution by processor 715. ROM 725 may include a ROM device or another type of static storage device that may store static information and instructions for use by processor 715. Storage device 730 may include a solid state, magnetic and/or optical recording medium.

Input device(s) 735 may include one or more mechanisms that permit an operator to input information to UE 110, such as, for example, a keypad or a keyboard, a microphone, voice recognition, components for a touchscreen, and/or biometric mechanisms, etc. Output device(s) 740 may include one or more mechanisms that output information to the operator, including a display, a speaker, etc. Communication interface 745 may include any transceiver mechanism that enables UE 110 to communicate with other devices and/or systems. For example, communication interface 745 may include mechanisms for communicating with another device or system via a network, such as access networks 120.

Secure Element (SE) 755 may be inserted into a secure element interface (I/F) (e.g., a smart card or Subscriber Identifier Module (SIM) card interface) of UE 110. SE 755 may store secure applications and data to permit UE 110 to perform trusted exchanges with other network entities. In alternative embodiments, SE 755 may be permanently coupled to UE 110, and thus cannot be removed by a user. SE 755 may include, for example, a Universal Integrated Circuit Card (UICC), a removable user identity card (R-UIM), a subscriber identity module (SIM), a universal subscriber identity module (USIM), or an Internet Protocol (IP) multimedia services identity module (ISIM).

In general, SE 755 provides a tamper-resistant platform (e.g., a single-chip secure microcontroller) capable of securely hosting applications and their associated confidential and/or cryptographic data (e.g., key management) in accordance with the rules and security requirements set forth by a set of well-identified trusted authorities. SE 755 may be capable of securely storing applications (hereinafter referred to as "secure applications") and cryptographic data (such as, for example, secure keys). The secure information stored in SE 755 may be managed in accordance with rules and security requirements provided by established trusted authorities.

UE 110 may perform certain operations or processes, as may be described in detail below. UE 110 may perform these operations in response to processor 715 executing software instructions contained in a computer-readable medium, such as memory 720 and/or storage device 730. A computer-readable medium may be defined as a physical or logical memory device. A logical memory device may include memory space within a single physical memory device or spread across multiple physical memory devices. The software instructions may be read into memory 720 from another computer-readable medium, such as storage device 730, or from another device via communication interface 745. The software instructions contained in memory 720 may cause processor 715 to perform operations or processes that will be described in detail with respect to FIG. 7, and exchange messages with other internal modules and/or external network devices. Alternatively, hardwired circuitry may be used in place of or in combination with software instructions to implement processes consistent with the principles of the embodiments. Thus, exemplary implementations are not limited to any specific combination of hardware circuitry and software.

The configuration of components of UE 110 illustrated in FIG. 7 is for illustrative purposes only. It should be understood that other configurations may be implemented. Therefore, UE 110 may include additional, fewer and/or different components than those depicted in FIG. 7.

Figure 8:
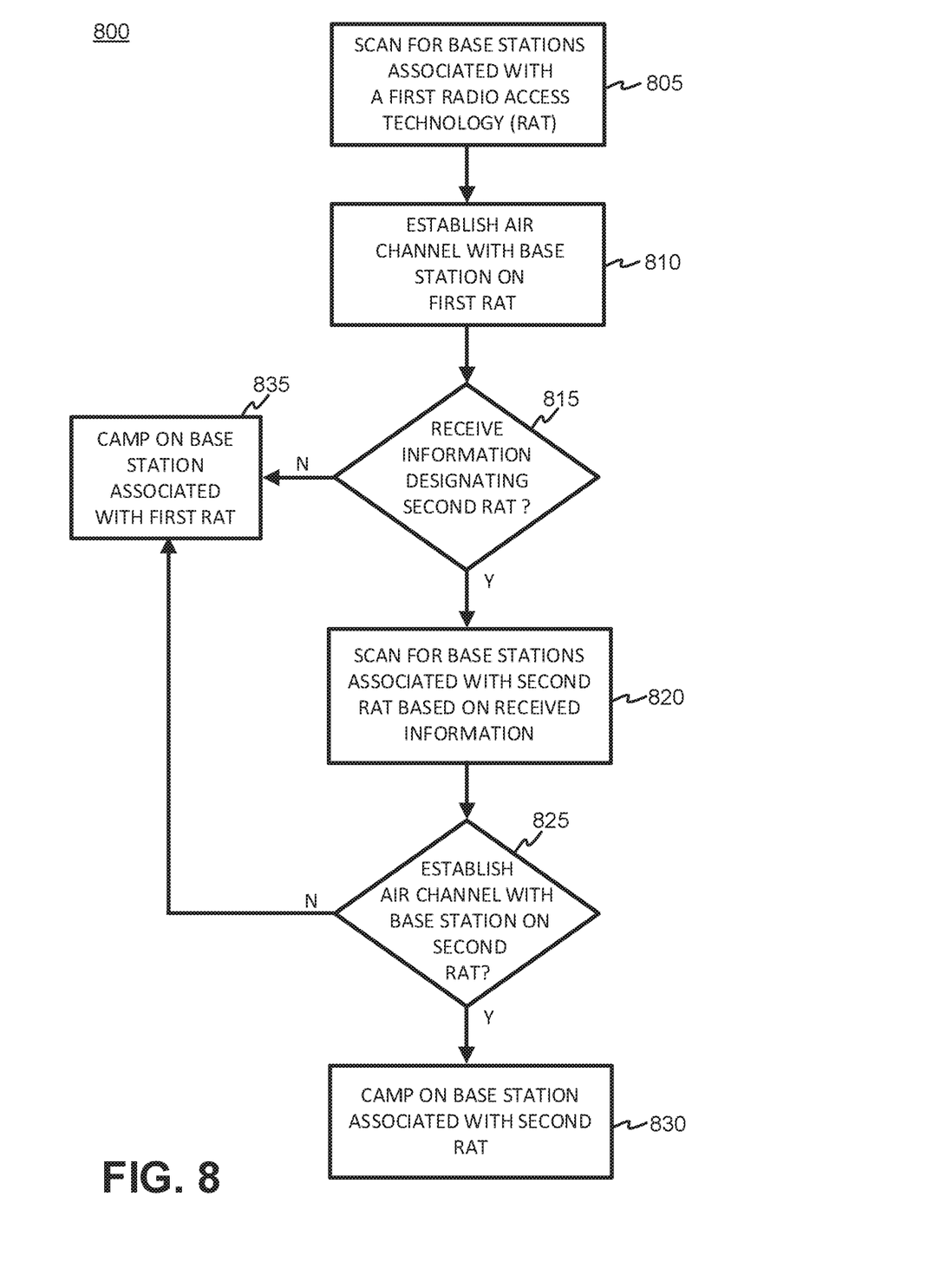
FIG. 8 is a flow chart showing an exemplary process for prioritizing scanning for a base station to improve system acquisition according to an embodiment.

FIG. 8 is a flow chart showing an exemplary process 800 for prioritizing scanning to improve system acquisition. Process 800 may be performed by UE 110, having processor 715 executing instructions stored in memory 720 and/or saved in storage device 730.

Processor 715 may initially scan for base stations associated with a first radio RAT (Block 805). Prior to scanning for base stations, processor 715 may first initialize UE 110 upon activation from a deactivated or idle state. In an embodiment, the first RAT may be associated with 4G wireless standard, such as, for example, LTE.

Processor 715 may establish a first wireless channel between UE 110 and a first base station (e.g., eNodeB 210) based on the first RAT (e.g., RAT 215) (Block 810). The first wireless channel may be established during an initial system acquisition, or during system reacquisition. Processor 715 may determine whether information designating a second RAT (e.g., RAT 217), was received via the first wireless channel (Block 815). Information designating the second RAT may be provided in one or more a system information blocks (SIBs), such as, for example, SIB 24. The information designating the second RAT may be transmitted by a neighboring base station, such as the first base station (e.g., eNodeB 210). For example, in an embodiment, processor 715 may obtain, from SIB 24, data regarding one or more frequencies (e.g., carrier frequency or multiple carrier frequencies) used by the second base station (e.g., gNodeB 220). In an embodiment, where multiple frequencies may be identified in the SIB, UE 110 may prioritize and/or select one or more frequencies suitable for a particular geography (e.g., urban or rural area), radio frequency environment (e.g., considering interference and/or other wireless conditions such as weather), and/or temporal considerations (time of day, month, season, etc.). The second RAT (e.g., RAT 217) associated with the second base station (e.g., gNodeB 220) may be based on the 5G wireless standard, and may have a higher priority than the first RAT.

Processor 715 may scan for base stations associated with the second RAT in response to receiving the information via the first wireless channel. In exemplary aspects, the scanning by the processor 715 is based on the received SIB information, included the received frequency information associated with the 5G base station (Block 820). Processor 715 may determine whether a second wireless channel based on the second RAT (e.g., RAT 217) is established between UE 110 and the second base station (e.g., gNodeB 220) (Block 825).

Processor 715 may camp on the second base station associated with the second RAT in response to determining that the second wireless channel or connection was established (Block 830). UE 110 may also monitor a channel, for example a paging channel, to detect incoming calls and acquire system information. In the idle mode, the control plane protocols include cell selection and reselection procedures. During a radio resource control (RRC) connected mode, UE 110 may provide the base station with downlink channel quality and neighbor cell information so the base station may assist UE 110 to select the most suitable cell. For example, UE 110 may monitor system information received within a number of SIBs (e.g., SIB1, SIB3-SIB6, etc.) and/or an RRC connection release message transmitted by the base station. UE 110 may further monitor and use information from SIB 24 in the event frequency scanning needs to be performed again. The UE may then perform signal measurements on the serving cell and neighboring cells, and then may reselect a better base station for camping based on reselection criteria.

In an embodiment, the reselection parameters read from the SIB may expedite a search for the second base station by narrowing the band of 5G frequencies scanned by UE 110. For example, the search can be expedited by avoiding the scanning of large portions of the 5G bandwidth which are not of interest with respect to reselection, and focusing the scan on one or more frequency bands specified by the SIB. In an embodiment, the SIB might specify multiple frequencies for reselection, and the search may be narrowed by scanning multiple bands of interest, and avoid scanning the remaining portion of the 5G band.

In response to determining that the second wireless channel was not established between UE 110 and the second base station, processor 715 may determine whether a predetermined period of time has expired. If the predetermined period of time has expired, processor 715 may have UE 110 camp on the first base station 210 associated with the first RAT 215 (Block 835).

In this manner, areas having neighboring and/or overlapping 4G and 5G cells, 4G base stations may transmit frequency information to expedite UEs establishing wireless connections with neighboring 5G base stations. In an embodiment, a 4G base station may broadcast over SIB information regarding one or more 5G base stations.

The foregoing description of implementations provides illustration and description, but is not intended to be exhaustive or to limit the invention to the precise form disclosed. Various preferred embodiments have been described with reference to the accompanying drawings. It will be evident that modifications and changes may be made thereto, and additional embodiments may be implemented, without departing from the broader scope of the invention as set forth in the claims that follow. For example, while series of messages, states, and/or blocks have been described with regard to FIG. 8, the order of the messages, states, and/or blocks may be modified in other embodiments. Further, non-dependent messaging and/or processing blocks may be performed in parallel. The specification and drawings are accordingly to be regarded in an illustrative rather than restrictive sense.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
scanning, by a user equipment device (UE), for base stations associated with a first radio access technology (RAT);
establishing, by the UE, a first wireless channel between the UE and a first base station based on the first RAT;
receiving a system information block (SIB) from the first base station via the first wireless channel, wherein the SIB includes information identifying at least one frequency associated with a second base station;
determining, by the UE, whether information associated with a second RAT was received via the SIB, wherein the second RAT has a higher priority than the first RAT;
scanning, by the UE, for base stations associated with the second RAT in response to receiving the information via the SIB, wherein the scanning is expedited by reducing a band of frequencies scanned by the UE based on information identifying the at least one frequency included in the SIB;
determining, by the UE, whether a second wireless channel based on the second RAT is established between the UE and the second base station; and
camping, by the UE, on the second base station associated with the second RAT in response to determining that the second wireless channel was established.

2. The method of claim 1, wherein prior to scanning for base stations associated with the first wireless channel, the method comprises:
initializing the UE upon activation from a deactivated state.

3. The method of claim 1, wherein the first RAT is associated with at least one of Long Term Evolution (LTE) wireless standard or a fourth generation (4G) wireless standard, and the second RAT is associated with the fifth generation (5G) wireless standard.

4. The method of claim 1, further comprising:
determining that information associated with a second RAT was received via the SIB; and
obtaining data from the SIB, the data associated with the second base station.

5. The method of claim 4, wherein obtaining data from the SIB further comprises:
identifying data associated with multiple frequencies associated with the second base station.

6. The method of claim 5, wherein identifying data associated with multiple frequencies associated with the second base station further comprises:
reading, from the SIB, reselection parameters for the at least one frequency to expedite a search for the second base station by narrowing the band of 5G frequencies scanned by the UE, wherein the at least one frequency has a higher priority than a frequency associated with the first RAT.

7. The method of claim 1, further comprising:
in response to determining that the second wireless channel was not established between the UE and the second base station, camping, by the UE, on the first base station associated with the first RAT.

8. A user equipment (UE) device, comprising:
a network interface;
a memory configured to store instructions; and
a processor coupled to the network interface and the memory, wherein the processor is configured to execute the instructions stored in the memory to:
scan for base stations associated with a first radio access technology (RAT),
establish a first wireless channel between the UE device and a first base station based on the first RAT,
receive a system information block (SIB) from the first base station via the first wireless channel, wherein the SIB includes information identifying at least one frequency associated with a second base station,
determine whether information associated with a second RAT was received via the SIB, wherein the second RAT has a higher priority than the first RAT,
scan for base stations associated with the second RAT in response to receiving the information via the SIB, wherein the scanning is expedited by reducing a band of frequencies scanned by the UE device based on information identifying the at least one frequency included in the SIB,
determine whether a second wireless channel based on the second RAT is established between the UE device and the second base station, and
camp on the second base station associated with the second RAT in response to determining that the second wireless channel was established.

9. The UE device of claim 8, wherein prior to the processor scanning for base stations associated with the first wireless channel, the instructions further cause the processor to:
initialize the UE device upon activation from a deactivated state.

10. The UE device of claim 8, wherein the first RAT is associated with at least one of Long Term Evolution (LTE) wireless standard or a fourth generation (4G) wireless standard, and the second RAT is associated with the fifth generation (5G) wireless standard.

11. The UE device of claim 8, wherein the instructions further cause the processor to:
determine that information associated with a second RAT was received via the SIB; and
obtain data from the SIB, the data associated with the second base station.

12. The UE device of claim 11, wherein the instructions to obtain data from the SIB further cause the processor to:
identify data associated with multiple frequencies associated with the second base station.

13. The UE device of claim 12, wherein the instructions to identify data associated with multiple frequencies further cause the processor to:
read, from the SIB, reselection parameters for the at least one frequency to expedite a search for the second base station by narrowing the band of 5G frequencies scanned by the UE device, wherein the at least one frequency has a higher priority than a frequency associated with the first RAT.

14. The UE device of claim 8, wherein
in response to the processor determining that the second wireless channel was not established between the UE device and the second base station, the instructions further cause the processor to:
camp on the first base station associated with the first RAT.

15. A non-transitory computer-readable medium comprising instructions, which, when executed by a processor, cause the processor to:
scan, by a user equipment device (UE), for base stations associated with a first radio access technology (RAT);
establish, by the UE, a first wireless channel between the UE and a first base station based on the first RAT;
receive a system information block (SIB) from the first base station via the first wireless channel, wherein the SIB includes information identifying at least one frequency associated with a second base station;
determine, by the UE, whether information associated with a second RAT was received via the SIB, wherein the second RAT has a higher priority than the first RAT;
scan, by the UE, for base stations associated with the second RAT in response to receiving the information via the SIB, wherein the scanning is expedited by reducing a band of frequencies scanned by the UE based on information identifying the at least one frequency included in the SIB;
determine, by the UE, whether a second wireless channel based on the second RAT is established between the UE and the second base station; and
camp, by the UE, on the second base station associated with the second RAT in response to determining that the second wireless channel was established.

16. The non-transitory computer-readable medium of claim 15, wherein the instructions to scan for base stations associated with the first wireless channel further cause the processor to:
initialize the UE upon activation from a deactivated state.

17. The non-transitory computer-readable medium of claim 15, wherein the first RAT is associated with at least one of Long Term Evolution (LTE) wireless standard or a fourth generation (4G) wireless standard, and the second RAT is associated with the fifth generation (5G) wireless standard.

18. The non-transitory computer-readable medium of claim 15, wherein the instructions further cause the processor to:
determine that information associated with a second RAT was received via the SIB; and
obtain, from the SIB, data associated with the second base station.

19. The non-transitory computer-readable medium of claim 18, wherein the instructions to obtain data from the SIB further cause the processor to:
identify data associated with multiple frequencies associated with the second base station.

20. The non-transitory computer-readable medium of claim 19, wherein the instructions to identify data associated with multiple frequencies further cause the processor to:
read, from SIB, reselection parameters for the at least one frequency to expedite a search for the second base station by narrowing the band of 5G frequencies scanned by the UE, wherein the at least one frequency has a higher priority than a frequency associated with the first RAT.

* * * * *